(12) United States Patent
Sugiyama et al.

(10) Patent No.: US 6,449,986 B2
(45) Date of Patent: *Sep. 17, 2002

(54) METHOD OF PRODUCTION OF POROUS GLASS BASE MATERIAL FOR OPTICAL FIBER WITH CLEANING OF THE BURNER WITH GAS AT 25 M/S OR FASTER

(75) Inventors: Takashi Sugiyama; Masahiko Matsui; Nobuyuki Hirano; Naoyuki Fukushima; Takao Kabaya, all of Yokohama (JP)

(73) Assignee: Sumitomo Electric Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/423,237

(22) PCT Filed: Dec. 10, 1998

(86) PCT No.: PCT/JP98/05600

§ 371 (c)(1),
(2), (4) Date: Nov. 5, 1999

(87) PCT Pub. No.: WO99/43625

PCT Pub. Date: Sep. 2, 1999

(30) Foreign Application Priority Data

Feb. 26, 1998 (JP) .......................................... 10-045346

(51) Int. Cl.⁷ .......................................... C03B 37/018
(52) U.S. Cl. .............................. 65/413; 65/414; 65/421; 65/27; 65/424; 65/503; 65/532
(58) Field of Search ............................. 65/27, 413, 414, 65/421, 424, 503, 532

(56) References Cited

U.S. PATENT DOCUMENTS

| | | | | |
|---|---|---|---|---|
| 4,303,386 A | * | 12/1981 | Voorheis et al. ............ | 431/177 |
| 4,803,948 A | * | 2/1989 | Nakagawa et al. ........... | 118/50 |
| 5,291,841 A | * | 3/1994 | Dykema ...................... | 110/345 |
| 5,567,141 A | * | 10/1996 | Joshi et al. .................. | 239/419 |
| 5,578,130 A | * | 11/1996 | Hayashi et al. ............. | 118/719 |
| 5,979,185 A | * | 11/1999 | Blackwell | |
| 6,094,940 A | * | 8/2000 | Fujiwara | |
| 6,112,676 A | * | 9/2000 | Okazaki et al. ............. | 110/261 |
| 6,164,956 A | * | 12/2000 | Payne et al. ................. | 122/390 |
| 6,176,894 B1 | * | 1/2001 | Anderson et al. ............ | 75/10.4 |
| 6,367,288 B1 | * | 4/2002 | Lindner et al. ............. | 431/159 |
| 6,377,596 B1 | * | 4/2002 | Tanaka et al. ................ | 257/52 |

FOREIGN PATENT DOCUMENTS

| | | |
|---|---|---|
| JP | 62-162642 | 7/1987 |
| JP | 63-81928 | 5/1988 |
| JP | 63-123831 | 5/1988 |
| JP | 4-175239 | * 6/1992 |
| JP | 5-116979 | 5/1993 |
| JP | 5-170472 | 7/1993 |
| JP | 06-235829 | 8/1994 |
| JP | 09-188523 | 7/1997 |

* cited by examiner

*Primary Examiner*—John Hoffmann
(74) *Attorney, Agent, or Firm*—McDermott, Will & Emery

(57) ABSTRACT

In a method of manufacturing a porous glass preform for an optical fiber which preform is formed as a deposit of fine glass particles by using a burner, a method to prevent the contamination of any glass particles having failed to be properly deposited so that the generation of voids may be minimized in a transparent glass preform which is produced by heating the porous glass preform. An inert gas is caused to flow through the burner at a rate of at least 25 m/s before fine glass particles are formed by the hydrolysis and/or oxidation of a glass material in a flame produced by the burner supplied with a mixture of a gas of the glass material and a gas for combustion and are deposited on a rotating starting member. It is desirable to elevate the pressure of the inert gas above the atmospheric pressure by a device connected to the burner by a pipeline, and cause it to flow rapidly through the burner.

7 Claims, 2 Drawing Sheets

METHOD OF PRODUCTION OF POROUS GLASS BASE MATERIAL FOR OPTICAL FIBER WITH CLEANING OF THE BURNER WITH GAS AT 25 M/S OR FASTER

TECHNICAL FIELD

This invention relates to a method of manufacturing a porous glass preform for an optical fiber, and more particularly to an improvement in the method of manufacturing a porous glass preform by depositing fine glass particles formed by hydrolysis in a flame produced by a burner.

BACKGROUND ART

One of the known methods of manufacturing a porous glass preform for an optical fiber is the vapor phase axial deposition (VAD) method. In this method, as shown in FIG. 2, a mixture of a gas for combustion and a gas of a glass material is jetted out through a burner used for forming glass particles, hereafter simply 'burner' 2 (or 2') to produce a flame 3 (or 3') in which the glass material is hydrolyzed or oxidized to form fine glass particles, and while the glass particles are deposited on the lower end of a rotating starting member 6, to form a deposited porous body, the starting member 6 is moved relative to the burner 2 (or 2') with the growth of the porous body, whereby a porous glass preform 1 is obtained. Although the method shown in FIG. 2 employs two burners, a method using only one burner, or more than two is alternatively possible. The porous glass preform 1 is heated in an electric furnace to form a transparent glass preform and it is drawn into an optical fiber.

In the conventional VAD method the burner 2 (or 2') is provided with, for example, $SiCl_4$ as the glass material, and a fuel gas such as a hydrogen or hydrocarbon gas, and a gas assisting combustion, such as oxygen or air, as the gases for combustion. Fine glass particles ($SiO_2$) are formed by reaction of the following formula (I):

$$SiCl_4 + 2H_2O \rightarrow SiO_2 + 4HCl \qquad (I)$$

Not all of the glass particles that are formed, however, are deposited as the preform 1. Some of the glass particles float in the reaction vessel 4 and attach to its inner wall to form a layer of glass particles thereon. If this layer grows to some extent in thickness, glass particles are likely to fall off the reaction vessel wall, attach to the surface of the porous glass preform 1 and form a gap therein. In this case, the voids may be formed when the preform is heated into transparent glass.

As a method for solving this problem, the following method has been proposed in Unexamined Published Japanese Patent Applications Nos. 162642/1987 and 123831/1988. A heater and an outlet to a reaction vessel for gas are added, and the gas heated to high temperature is forced to flow around the burner and the porous glass preform along the inner wall of the reaction vessel; thereby the gas is prevented from remaining near the inner wall of the reaction vessel; glass particles are prevented from attaching to the reaction vessel; the gas is caused to flow in the reaction vessel so as to retain the glass particles from floating in the reaction vessel. The burner for synthesizing glass particles also has a problem with respect to the attachment and mixture of glass particles. Namely, when the mixture of the combustion gas and the glass material is jetted from the tip of the burner for synthesizing glass particles, a part of the gas mixture is likely to scatter around the burner and attach to the vicinity of its outlet as glass particles. The glass particles are also likely to even enter the burner as a result of their entrainment by the gas surrounding it. Moreover, even if the floating of glass particles may be restrained during the synthesizing of glass particles, by the method proposed in the above mentioned patent applications, it is still likely that after the manufacturing of a preform is stopped, the glass particles may enter the burner during the cooling of the preform.

If the glass particles which have attached to the burner, or entered it as described above are left as they are, they are likely to leave the burner and attach to the surface of a preform during the subsequent preform manufacturing. In this case also, the particles attach in a manner different from new particles produced in a flame and deposited on the preform, and are likely to form voids when it is heated into transparent glass. Moreover, the attached glass particles spoil the burner if they form transparent glass in the burner under the heat of the gas for combustion. Therefore, it is necessary to clean the burner after manufacturing of each preform by removing, by suction or other means, the glass particles which have attached or entered therein.

DISCLOSURE OF THE INVENTION

Although the methods proposed in the above mentioned patent applications have been somewhat effective for preventing the glass particles from attaching to the inner wall of the reaction vessel of glass particles, the formation of voids in a preform by the glass particles attaching to it is still an outstanding problem.

The glass particles are likely to remain not only in the reaction vessel, but also in the burner even after it is cleaned as mentioned above, and attach to a preform after starting of the synthesizing and become the cause of the voids. Namely, the attached glass particles may fall of the reaction vessel wall or the outlet end of the burner when manufacturing of a preform is stopped, or may not be sucked from the burner completely even by very careful cleaning, and may enter it. Some of the falling glass particles sometimes enter deep into the burner, for example, near its joint to a pipeline, and hence their removal by suction is very difficult. The creating of a sufficiently large pressure difference for removing any foreign matter from such a deep region in the burner by suction is very likely to result in the destruction of its glass wall having a thickness of, say, only 1 mm near its outlet end. The use of a new burner for manufacturing each preform is a very costly solution to such a problem.

Under these circumstances, it is a subject of this invention to provide a method which can prevent fine glass particles from attaching to a burner, or entering it, and thereby avoid the formation of voids in a transparent glass preform.

This subject is essentially attained by starting the deposition of fine particles of glass after causing an inert gas to flow at a rate of at least 25 m/s through a burner for producing those particles.

The inert gas preferably has a pressure elevated above the atmospheric pressure. The pressure of the inert gas is preferably elevated by a pressurizer connected to the burner. The inert gas is preferably caused to flow at a rate of 25 to 50 m/s. When the inert gas is made to flow in the burner for manufacturing glass particles the pressure is preferably reduced by at least about 0.1 kPa in an exhaust pipe extending form reaction vessel in which the burner is mounted.

Figure 1:
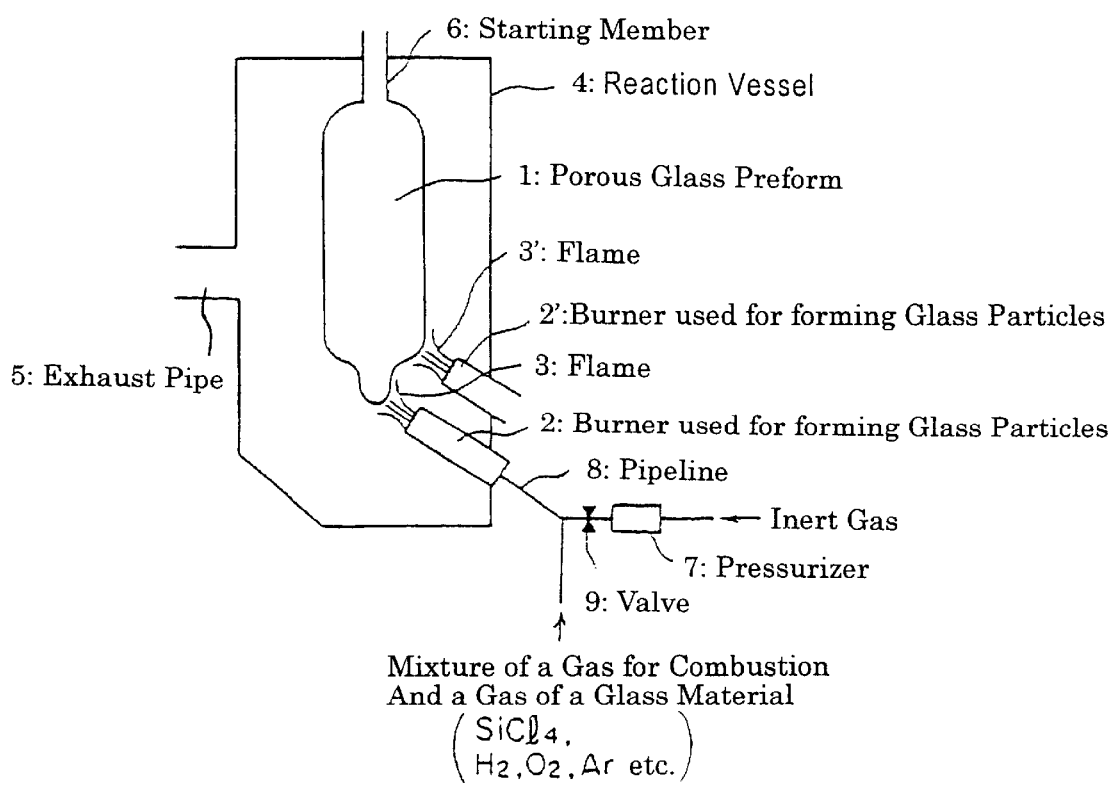
FIG. 1 is a schematic sectional view illustrating the method of this invention.

In the drawings, 1 is a porous glass preform, 2 and 2' are each a burner for producing fine particles of glass, 3 and 3' are each a flame, 4 is a reaction vessel, 5 is an exhaust pipe, 6 is a starting material, 7 is a pressurizer, 8 is a pipeline, and 9 is a valve.

BEST MODE FOR CARRYING OUT THE INVENTION

According to this invention, an inert gas is introduced into a burner for producing fine glass particles so as to flow at a rate of at least 25 m/s therethrough before the deposition of fine particles of glass starts to form a porous glass preform. Glass particles which are attached to the burner or have entered it and any other foreign matters can easily be removed from the burner, and discharged from the muffle through an exhaust pipe by the inert gas flowing out of the burner. Even such particles or foreign matter entering the burner during or after its cleaning can be removed easily if the inert gas is introduced immediately before the formation of a preform is started.

In this invention, the flow rate of the inert gas in the burner for producing fine glass particles is 25 m/s or more, and particularly preferably from 25 to 50 m/s. At a rate below 25 m/s, the gas may fail to remove the entered glass particles thoroughly from the burner, while at a rate above 50 m/s, it is likely to exert so heavy a load on the joint between the burner 2 and a pipeline 8 (FIG. 1) or the burner 2 itself to cause it to be broken. As a method for flowing the inert gas at a rate of at least 25 m/s, an inert gas having an elevated pressure is flowed, and its flow rate may be adjusted depending on its pressure.

The inert gas may be of any kind if it does not have any adverse effect on the burner, and if it does not contain any foreign matter, such as a metal powder, or dust, that may remain in a porous glass preform and eventually in an optical fiber and increase its transmission loss. Examples of the inert gas are nitrogen, argon and helium.

The invention will now be described more specifically with reference to FIG. 1. In this invention, the method for synthesizing the porous glass preform itself is the same as the conventional method. A gas of the glass material and if required, a mixed gas containing a dopant gas, a fuel gas, a gas for assisting combustion and an inert gas are supplied to burners 2 and 2' for synthesizing glass particles in a [muffle] reaction vessel 4. The glass material is hydrolyzed and/or oxidized in flames 3 and 3' produced by the burners 2 and 2' to form fine glass particles, and those particles are deposited on a starting member 6, to form a porous glass preform 1. The gas in the reaction vessel 4 is exhausted through an exhaust pipe 5.

According to this invention, before starting the synthesizing of the porous glass preform 1, an inert gas of which pressure is elevated by a pressurizer so as to flow at a rate of at least 25 m/s in the burner, is introduced at a stretch into the burner through a pipe line and a valve, and thereby the inner part of the burner is cleaned. Although the pressurizer 7, pipeline 8 and valve 9 are shown only for the burner 2, the burner 2' is also provided with a pressurizer, a pipeline and a valve, and is likewise supplied with an inert gas to clean it.

Here, "an inert gas is introduced at a stretch" mentioned above means a method in which the valve 9 of the pipeline 8, the pressure of which is elevated, is opened in an instant and is kept open for about five seconds to allow the inert gas to flow and then the valve 9 is closed. More preferably, after the valve 9 is opened once, the valve 9 is shut and the pressure is elevated in the pipeline, and then the valve 9 is opened in an instant again and kept open for about five seconds to allow the inert gas to flow; thus these processes are repeated several times. The number of times for which it is repeated depends on the degree of contamination of the inner part of the burner.

In this case, the pressure of the exhaust pipe 5 is preferably reduced by about 0.1 kPa or more. This is because the glass particles which have flowed out of the burners 2, 2' for synthesizing the glass particles are prevented from floating in the muffle, and according to the inert gas flow, the foreign matters are exhausted to the exhaust pipe from the neighborhood of the inner wall of the 4 reaction vessel are cleaned more effectively.

Although FIG. 1 shows the mode in which two burners 2 and 2' are used for forming a porous glass preform 1, the method of this invention can also be carried out by using only one burner, or more than two burners.

Although the foregoing description has been based on the VAD method, this invention is equally applicable to any other method of forming a porous glass preform from glass particles produced by a burner, such as the outside vapor phasedeposition (OVD) method, to provide equally satisfactory results in the cleaning of the burner.

EXAMPLE

As an example, the porous glass preform was manufactured using equipment having the construction shown in FIG. 1 according to this invention. Each of the burners 2, 2' had a diameter of 50 mm and a length of 500 mm. Before starting the synthesizing, the pressure of nitrogen gas as an inert gas was elevated to 6 kg/cm$^2$ (or 588,399 Pa) by the pressurizer 7 and then, the valve 9 was opened in an instant and was kept open for about five seconds, and was shut. Then, the operations for elevating the pressure for about 20 seconds and opening the valve 9 for about 5 seconds at a stretch were repeated three times. When the valves 9 were opened, the inert gas flowed rapidly into the burners 2, 2' through the pipelines 8. It flowed at a rate of 25 m/s through the burners 2, 2'. The pressure of the exhaust pipe 5 was reduced by 0.1 kPa.

The burner 2 was supplied with $SiCl_4$ at a rate of 0.2 liter per minute, $GeCl_4$ at a rate of 0.1 liter per minute, hydrogen at a rate of 20 liters per minute, oxygen at a rate of 30 liters per minute and argon at a rate of 10 liters per minute, while the burner 2' was supplied with $SiCl_4$ at a rate of three liters per minute, hydrogen at a rate of 70 liters per minute, oxygen at a rate of 70 liters per minute and argon at a rate of 20 liters per minute.

Thus, there were produced 10 porous glass preforms 1 each having a diameter of 150 mm and a length of 800 mm. Each preform was heated in an electric furnace to form a transparent glass preform. The number of voids found in these transparent glass preforms was on the average only 0.2 per piece of them.

Figure 2:
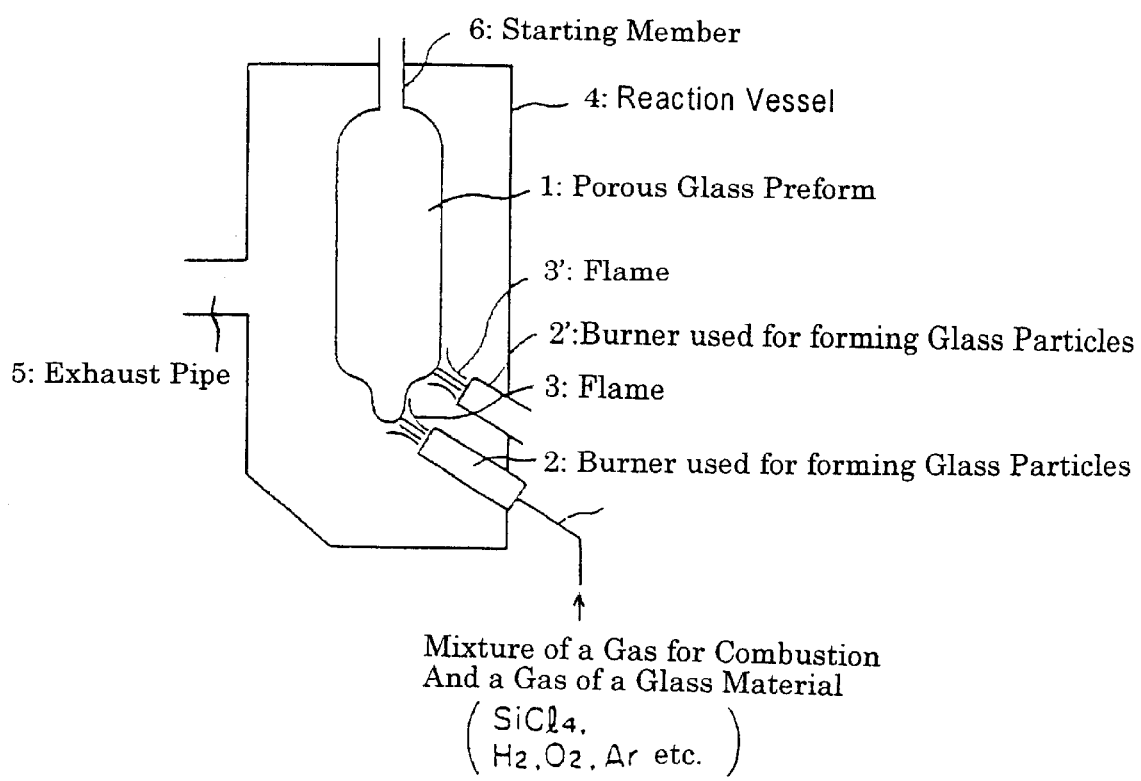
FIG. 2 is a schematic sectional view illustrating the known method.

For comparative purposes, 10 porous glass preforms each having the same size as stated in the above example were manufactured using equipment having the construction shown in FIG. 2, in the same manner with the example except that no inert gas having an elevated pressure was flowed through the burners 2, 2' for synthesizing glass particles before starting the formation of each preform. The porous glass preform thus obtained were heated under the same condition as in the above example so as to become transparent glass preforms, in which as many as 3.5 voids per piece on the average were found.

From the result of the above-mentioned example and comparative example, it is confirmed that this invention can form a transparent glass preform having a very small number of voids as compared with the product of the conventional method.

As is obvious from the foregoing, this invention makes it possible to prevent the contamination of any porous glass preform by glass particles attaching to, or remaining in the burners and thereby reduce greatly the voids that may eventually be formed in any transparent glass preform for an optical fiber.

This invention requires only a simple apparatus and a simple operation, and can be carried out even immediately before the formation of a porous glass preform is started. The cleaning of the burners prolongs their life and enables them to be used repeatedly for making many preforms. Therefore, this invention can very effectively reduce the cost of manufacturing porous glass preforms for optical fibers.

What is claimed is:

1. A method of manufacturing a porous glass preform for an optical fiber by depositing on the periphery of a rotating starting member, fine glass particles formed by the hydrolysis and/or oxidation of $SiCl_4$ in a flame, said flame is produced by at least one burner supplied with a mixed gas containing a gas of $SiCl_4$ and a gas for combustion, wherein an inert gas is caused to flow through said burner at a rate of at least 25 m/s before starting synthesis of said porous glass preform and after the formation of the previous glass preform.

2. A method as defined in claim 1, wherein said inert gas has a pressure elevated above the atmospheric pressure.

3. A method as defined in claim 2, wherein said pressurizer is elevated by a pressurized connected to said burner through a valve located in a different pipe line from the one for said mixed gas.

4. A method as defined in claim 2, wherein said pressure is elevated by a pressurizer connected to said burner and said inert gas is introduced at a stretch.

5. A method as defined in claim 1, wherein said rate is from 25 to 50 m/s.

6. A method as defined in claim 1, wherein said burner is mounted in a reaction vessel having an exhaust pipe, and the pressure of said exhaust pipe is reduced by at least about 0.1 kPa.

7. A method of manufacturing a porous glass preform for an optical fiber by depositing on the periphery of a rotating starting member fine glass particles formed by the hydrolysis and/or oxidation of $SiCl_4$ in a flame, said flame is produced by at least one burner supplied with a mixed gas containing a gas of said $SiCl_4$ and a gas for combustion wherein an inert gas is caused to flow through said burner at a rate of at least 25 m/s without said mixed gas before starting synthesis of said porous glass preform.

* * * * *

UNITED STATES PATENT AND TRADEMARK OFFICE
CERTIFICATE OF CORRECTION

PATENT NO.    : 6,449,986 B2
DATED         : September 17, 2002
INVENTOR(S)   : Takashi Sugiyama et al.

It is certified that error appears in the above-identified patent and that said Letters Patent is hereby corrected as shown below:

Column 6,
Lines 3-4, change "pressurizer" to -- pressure --;
Line 4, change "pressurized" to -- pressurizer --.

Signed and Sealed this

Fifteenth Day of July, 2003

JAMES E. ROGAN
*Director of the United States Patent and Trademark Office*